Patented June 11, 1935

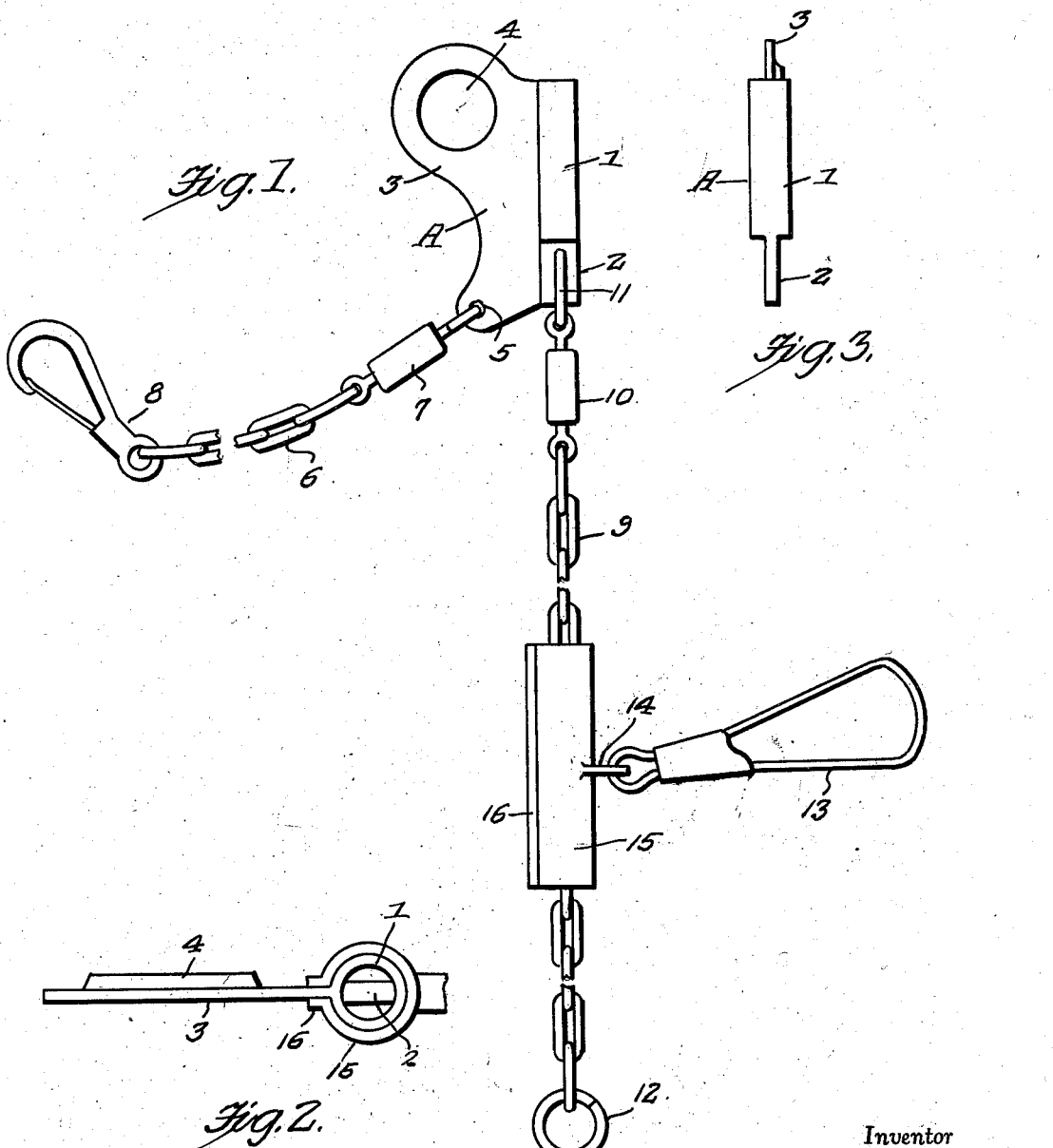

2,004,247

UNITED STATES PATENT OFFICE 2,004,247

FISH STRINGER

Benjamin V. McCaul, Fargo, N. Dak.

Application August 6, 1934, Serial No. 738,748

2 Claims. (Cl. 224—7)

This invention relates to a device for holding fish on individual hooks on a line attached to a boat, the general object of the invention being to provide means whereby the hooks with the fish thereon may be placed on the line without detaching the line from the boat or other place in which it is attached and without drawing the line from the water, thus keeping the fish already attached to the line in the water.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Fig. 1 is an elevation of the device showing the same in a position partly lifted and ready to receive a hook-carrying member.

Fig. 2 is an end view of the body member and showing a hook-carrying member in place over the same.

Fig. 3 is a view looking towards the rounded edge of the body member.

In this drawing, the letter A indicates the body member which has one edge formed with a rounded part 1 and a reduced flat part 2, the rest of the body member being substantially flat as shown at 3 and having an eye-forming part 4 at one end and a projection having a hole 5 at its other end. A chain 6 having a swivel 7 therein is attached to the body member by having a link or eye passing through the perforation 5 and a snap hook 8 or the like attached to the other end of the chain so that this end of the chain can be attached to a boat or other place to which the stringer is to be attached. A second chain 9 is connected by a swivel 10 to a link 11 which passes through a hole in the flat part 2 and a ring of split construction as shown at 12 is attached to the other end of the chain though any other suitable detachable member may be used instead of the ring. Each fish carrying hook 13 is attached to an eye 14 on a substantially tubular member 15 of split construction, the edges of the split being turned outwardly as shown at 16. This split is of sufficient width to pass over the flat part 3 when the tubular part is slipped over the rounded edge 1, as shown in Fig. 2 when the hook-carrying member is to be placed on the chain 9.

Thus, it will be seen that when a fish is to be placed on the device, the fish is first placed on the hook 13 and then the tubular member 15 is slipped over the parts 1 and 2 attached to the chain 9. Before this is done, the user grasps the member A and places one finger through the eye 4 and raises the device to the position shown in Fig. 1 after which the tubular member is placed over the parts 1 and 2 onto the chain. The member 15 will run down the chain until stopped by the ring 12 and then by dropping the device, the chains 6 and 9 will depend straight from the boat or other support and hold the member A in an offset position so that it will be impossible for the tubular member to be removed until the member 12 is removed. When another fish is to be placed on the device, the body member A is again lifted and the second tubular member is placed over the parts 1 and 2 as before described. The device should be made of non-rusting material.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A fish stringer comprising a body member having a handle part at one end adjacent one side, a chain connected to the other end adjacent the same side, the edge of the other side being enlarged, a second chain connected to the lower end of the body, a tubular member of split construction adapted to be slid over the enlargement and the second chain, means for attaching a fish to the tubular member, a detachable stop member at the lower end of the second chain, and means for connecting the first chain to a boat or the like.

2. A fish stringer comprising a body member of substantially flat construction and having a handle forming part at the upper end adjacent one side thereof, a chain connected to the other end adjacent the same side, means for attaching the other end of the chain to a boat or the like, a curved enlargement having a reduced part formed at the other side edge of the body member, a second chain pivotally connected to the reduced part, a split tubular member adapted to be slid over the circular part onto the second chain, a hook carried by the tubular member, a detachable stop at the lower end of the second chain.

BENJAMIN V. McCAUL.